March 4, 1930.  J. Y. SCOTT  1,749,514
VALVE RESEATING APPARATUS
Filed Nov. 7, 1927   2 Sheets-Sheet 2
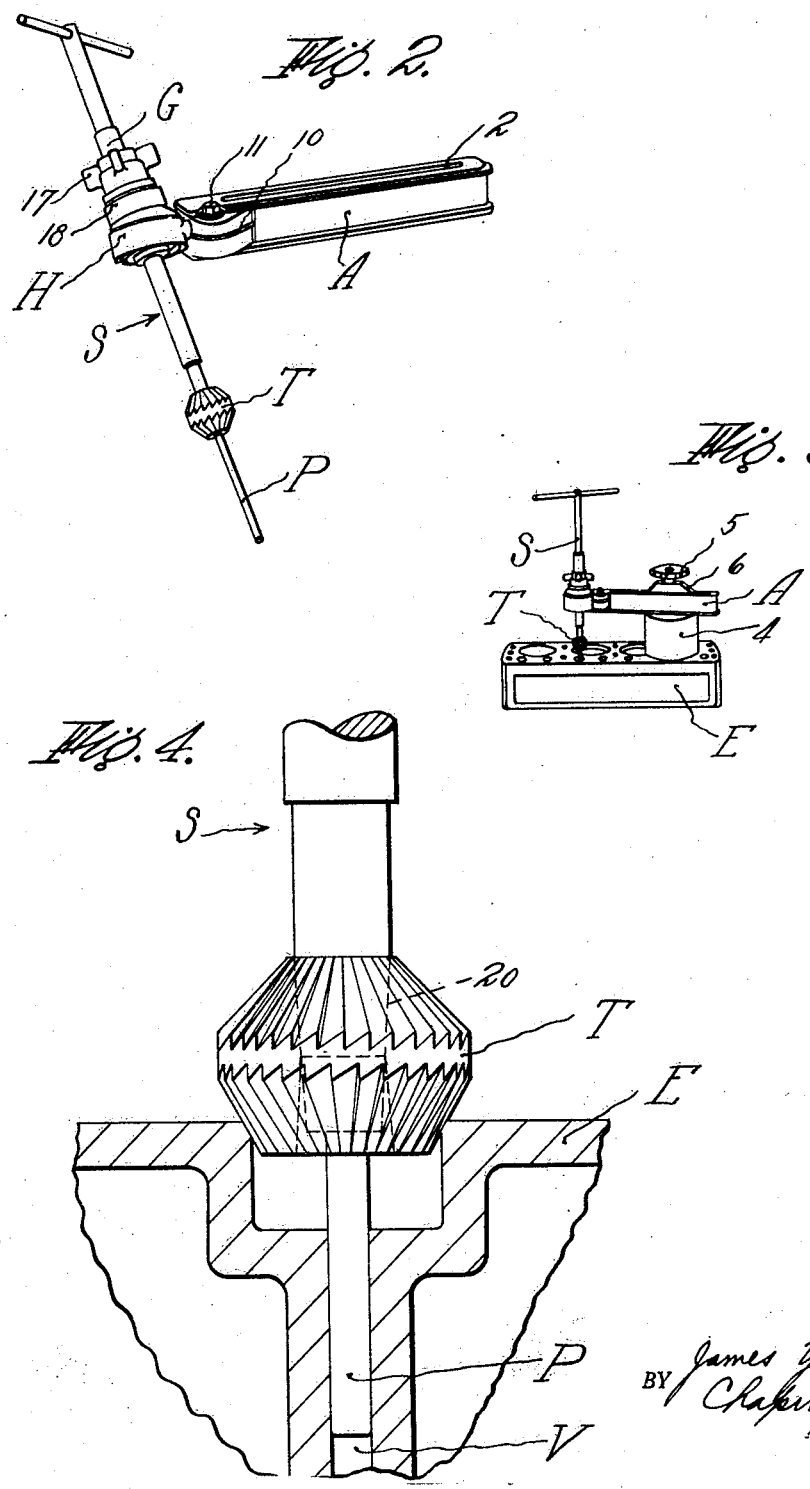
INVENTOR.
James Y. Scott
BY Chapin & Neal
ATTORNEYS.

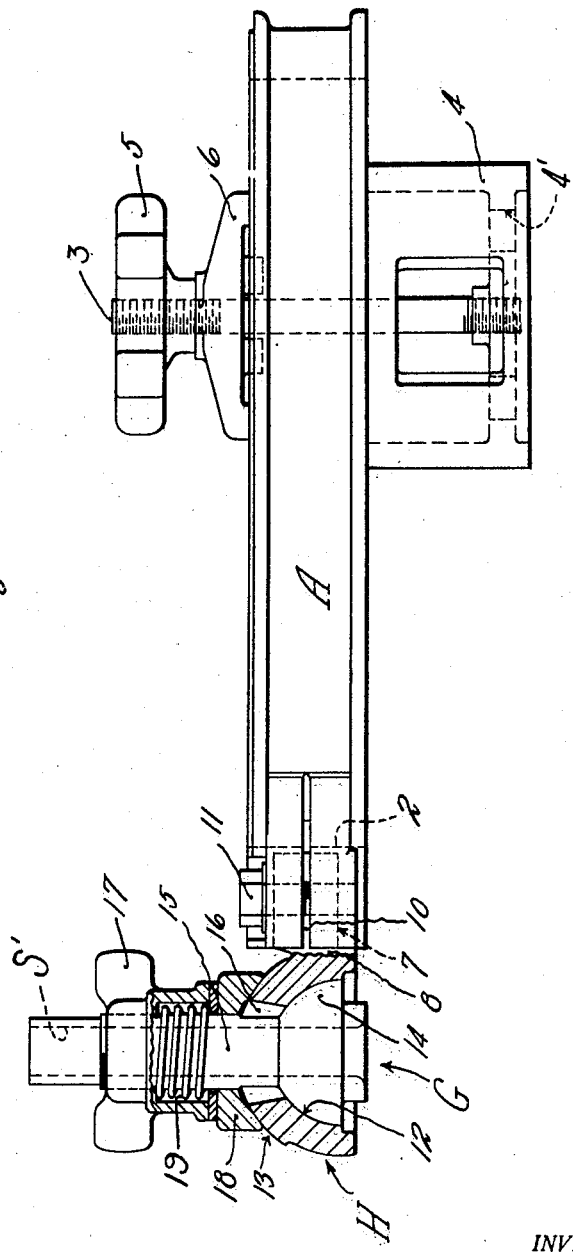

Patented Mar. 4, 1930

1,749,514

UNITED STATES PATENT OFFICE

JAMES Y. SCOTT, OF SPRINGFIELD, MASSACHUSETTS, ASSIGNOR TO VAN NORMAN MACHINE TOOL COMPANY, OF SPRINGFIELD, MASSACHUSETTS, A CORPORATION OF MASSACHUSETTS

VALVE-RESEATING APPARATUS

Application filed November 7, 1927. Serial No. 231,546.

This invention relates to improvements in apparatus for reseating or reconditioning valve seats, particulary the valve seats of internal combustion engines and the like.

As is well known, the inlet and outlet valves and valve seats of gas engines require conditioning at frequent intervals because the seating surfaces become burned and pitted and are worn out of concentricity with the valve guides while the valves and their stems or guides become warped and distorted. To recondition these valves, which is usually done in a repair shop rather than in a factory, it is customary to reseat or refinish the seats thereof by means of a rotating tool of some sort such as a reamer, stone or the like which has a pilot or guide for fitting in the valve stem guideway so as to align the tool in correct axial relation with the said guideway.

Inasmuch as the efficiency of an internal combustion engine is largely dependent upon the character of its inlet and exhaust valves, it is highly important that each of the valves thereof seats properly on its respective seat in closing. To insure this, the seating surfaces of the valve seat in the head and valve must be smooth and flat and exactly concentric with relation to the valve stem or guideway. Therefore any reseating apparatus must be capable of forming a seat so that it is exactly concentric with the guide or stem of the valve because the valve often turns on its axis during the operation of the engine.

I am aware that apparatus has heretofore been employed which comprises a tool carrying spindle reciprocably and rotatably carried in a guide which is adjustable to permit the spindle to be located in alignment with the axis of the valve guideway while means are provided to secure said apparatus to a cylinder block or cylinder head. With such devices, the tool spindle guide is first moved into alignment with a valve stem guideway and when properly adjusted with respect thereto the guide is clamped in position, after which a reseating tool is slipped onto a taper of the spindle. Due to the nature of this apparatus as formerly employed, the clamping of the guide tends to throw the guide and spindle out of alignment. This of course causes a corresponding inaccuracy in the surfacing of the valve seat and to this extent negatives the positioning effect of the pilot.

According to one novel feature of my invention, I provide an apparatus which is capable of guiding a tool spindle in various angular positions so that I am able to perform a reseating operation on valve seats which are disposed at wide angles with respect to the upper finished surface of an engine block or head. This is accomplished by providing a guide for the spindle which is arranged for swinging movements in a head which is in turn movable in the support, and not only is it possible to successfully work on angularly disposed seats but, due to the flexibility of the apparatus, it is possible to work on a number of seats with the support in one location on the head.

According to another novel feature of the invention, I provide a relatively movable spindle guide and head and means for clamping one to the other which is so constructed and arranged that after the tool spindle is adjusted to correct axial position, the spindle guide may be securely clamped without disturbing the axial alignment of the spindle, the clamping action taking place in direct alignment with the axis.

As a further novel feature, the guide for the spindle is so constructed and mounted in its support that any end thrust resulting in removing a tool from the spindle is transmitted to the support in a direction corresponding to the axis of the spindle so that the spindle's alignment is not affected by such end thrust.

Other objects and advantages will be observed from the following description of the invention which, for descriptive purposes, is illustrated in the form at present preferred by means of the accompanying drawings, in which:

Fig. 1 is a side elevational view of a reseating apparatus embodying the features of my invention;

Fig. 2 is a small scale perspective view of the apparatus showing how the head and spindle guide thereof may be moved relative to one another and secured in various positions of adjustment;

Fig. 3 is a small scale perspective of the apparatus in position on an engine head and in place for a reseating operation; and Fig. 4 is a diagrammatic sectional view through the valve seat of an engine block or head and showing the reseating tool in position for a reseating operation.

Referring to the drawings in detail, the apparatus comprises a support A which is preferably in the form of an arm which has a slot 2 extending longitudinally thereof, as shown in Figs. 1 and 2, for receiving a clamping bolt 3. A spacing member 4 is provided which may take any form desired, that shown being in the form of a hollow cylinder which is adapted to rest upon and be secured to the upper side of an engine block or a cylinder head and support the supporting member A in position above the surface of the block. The bolt 3 is in threaded engagement with the member 4 and a clamping nut 5 in threaded engagement with the upper end thereof bears upon a washer 6 which rests on the arm. By turning the nut 5, the arm may be securely clamped to the member 4 which is provided with openings 4' which may receive cylinder head bolts by the means of which the member may be securely clamped to a head block or the like. By providing the longitudinal slot 2, the support A may not only be swung with respect to the head if desired but may be moved back and forth and clamped in any desired position of adjustment.

One end of the arm is provided with an opening 7 for receiving a cylindrical shank 8 of a head H and is split at 10 and provided with a clamping screw 11 in threaded engagement therewith for drawing the end of the arm together to securely clamp the shank and hold the head in various positions of adjustment and provide a rigid support for a spindle guide G.

The head H is provided with a socket or seat 12 on its inner side which is preferably curved as shown while its opposite or outer side is provided with a similarly curved surface 13 which is preferably concentric to the socket 12.

The guide G has a curved portion 14 which is complemental to the socket 12 and has a shank 15 which extends therefrom and passes through an aperture 16 of the head, the upper end of said shank being screw threaded as shown so as to receive a clamping nut 17, while a central axial bore S' extending through the guide is adapted to receive a reciprocable and rotatable tool spindle S.

A clamping washer 18 fits loosely over the guide shank 15 and has a curved seat to coincide with the outer surface of the head and is adapted to bear thereon and to draw the guide G into the socket accordingly as the nut 17 is screwed onto the shank to clamp the guide and head together. A spring 19 surrounding the shank 15 of the guide and disposed in a recess of the nut is provided so that when the clamping nut is loosened the guide will be urged into the socket and while it will not prevent a relative swinging action of the guide and head, it will hold the parts in snug relation and permit swinging movements of the guide for adjusting purposes. The spring 19, when held under tension by the nut 17, permits the tool spindle to shift angularly to follow the position determined by the pilot P, but prevents any lateral movement of the spindle. When this position is determined and the support A is firmly clamped by the nut 5, the position of the tool spindle, and therefore of the tool itself, is definitely determined both above and below the tool. Below the tool lateral movement is prevented by the pilot, above the tool by the interengaging spherical surfaces of the guide G and the head H. If the pilot is of too loose a fit or is for any other reason unreliable or insufficient as a guide the clamp nut 17 can be fully tightened down, clamping the tool spindle rigidly against all movement—whether lateral or oscillatory, without disturbing the initial accurate position given by the pilot.

The contacting surfaces of the guide and head are preferably finished so as to provide substantially smooth contacting bearing surfaces so that one will bear evenly on the other throughout their area. The opening 16 may be of any size desired depending upon the amount of swinging movement of the guide it is desired to obtain.

The spindle S has a body portion for fitting in the guide so as to slide back and forth as well as turn in the guide G, and is preferably provided near its lower end with a tapered portion 20 for receiving a tool T. A lower pilot portion P is provided on the lower end of the spindle for fitting in a valve stem guideway such as is usually provided in an engine block or head for guiding a valve in its up and down movements.

The tool to be employed may take any form desired depending upon the work in hand and of course may be secured to the spindle by other means than the taper shown.

In practice it is customary to provide a set of spindles having different sized pilots for fitting in guideways of different sizes, but it may be equally desirable to provide a set of pilots which may be removably secured to the lower end of a single spindle.

In operation, when it is desired to reseat or resurface the valve seats of an engine block or head E, the support A is loosely clamped in a spaced relation above the block or head and the end of the arm A carrying the spindle guide is swung so as to locate the same over the valve seat to be worked upon. When working on valves whose guideways are vertical with the upper face of a head or block, the head H is clamped securely to the arm A because the guide G may be swung sufficiently to make the proper adjustment while when working on angularly disposed valves the head may be tilted in the arm and the guide swung in the head so that a spindle may be slipped through the guide and its pilot entered in the guideway of the valve. Of course, spindles having various sized pilots may be tried until one having a pilot which will not wobble in the guideway is found and which will properly guide the spindle and permit a free rotation thereof. By thus entering the pilot in the guideway, the spindle is aligned with respect to the guideway and then the guide G is clamped securely to the head H and the arm A is clamped to the spacer 4.

It will be noted that during the operation of clamping the guide G to the head any relative movement is in a direction along the axis of the spindle as distinguished from a direction opposed thereto, wherefore the alignment of the spindle is not disturbed by the clamping of the parts. This purely axial clamping action, occurring both when the spring 19 is employed alone to hold the tool spindle and when the nut 17 is tightened down, avoids the disturbance of alignment resulting from the action of the clamping devices in prior structures of this general character. The accuracy with which the tool is positioned by the pilot is thus retained during the resurfacing operation.

When the parts are thus clamped so as to hold the spindle in correct position, the spindle is elevated to raise the pilot above the valve seat and guideway so that a cutting tool of such form as it is desired to use may be slipped over the pilot. The tool T is supported by the fingers of one hand, the pilot passing between the fingers while the upper end of the spindle is grasped by the other hand and then by moving the hands towards one another the tool is slipped up onto and in driving relation with the taper of the spindle.

The spindle is then lowered so that the tool rests lightly on the seat, after which the spindle may be rotated so that the tool will operate on the seat and perform the desired machining or reseating operation.

When it is desired to replace the tool with another of different type to perform a subsequent operation on the seat, the spindle is pulled upwardly through the guide so that the upper side of the tool strikes smartly against the lower end of the guideway. This removes the tool from the taper of the spindle so that it may be caught by the hand below the lower end of the spindle pilot. If it is desired to perform another or subsequent operation on the same seat, it will be readily obvious that the alignment of the spindle must not be disturbed by the striking of the tool against the guide. By providing the curved socket and guide shown and described, any forces applied to the guide at its lower end will be in a direction corresponding to the axis of the spindle so that its alignment is not disturbed.

When the reseating operation or operations have been completed on one valve, the head H may be swung on its pivot with respect to the support and the guide G swung with respect to the head and if necessary the support may be swung or reciprocated with respect to the bolt and spacer so that the spindle may be located in alignment with other valves and guideways. By providing a head for supporting the guide which is movable with respect to the support as distinguished from a structure where the guide is merely movable in the support, I am not only able to adjust the apparatus for working on valves whose guideways are disposed perpendicular to the upper surface of the head but am able to reface valves whose guides are disposed at various angles thereto and also by reason of the universality of the apparatus am able to operate on a number of valves whether perpendicular or not with the support clamping screw in the one bolt hole of the head.

Obviously other means than that shown may be employed for clamping the support A to an engine block or head or for clamping the head H to the support, the form shown having been found to be satisfactory for repair shop uses. While the apparatus is shown made with an adjustment between the support A and the head H to facilitate the facing of valve seats at extreme angles, the head can be made integral with the support A and the necessary angles secured by enlarging the opening 16 and thereby permitting an increased degree of angular adjustment of the spindle guide G with respect to the support.

From the foregoing it will be observed that I have provided a spindle guide and head which are so constructed and arranged as to be clamped in various positions of angular adjustment and that any relative movement which is caused by clamping them in adjusted positions is in a direction coincidental to the axis of the spindle, whereby the alignment of the spindle is not disturbed. As a further feature, it will be noted that since the axis of movement of the guide and head is coincidental with the axis of the spindle, any forces applied to the lower end of the guide will be transmitted to the head along the axis of the spindle rather than in a direction opposed thereto which would tend to disturb the adjustment of the parts.

I am aware that many changes may be made in the form of the invention without departing from the scope thereof, and I prefer to be limited if at all by the appended claims rather than by the foregoing description.

What I claim is:

1. An apparatus of the class described comprising in combination, a support, a guide receiving member adjustably movable in said support, a tool spindle guide adjustably movable in said member having an opening therein for receiving a tool spindle, means carried by said guide operable axially thereof for clamping said guide in adjusted position to said member and a tool spindle.

2. An apparatus of the class described comprising in combination, a support, a guide receiving member movable in said support, a spindle guide arranged for swinging movements in said member and means axially exerted relative to said guide for securing the guide to said member in any of the various positions of adjustment and a tool spindle movable in said guide.

3. An apparatus of the class described comprising in combination, a support, a head member pivotally adjustable in said support and means for clamping the same in various positions of adjustment, a guide on said head arranged for a swinging movement relative thereto, means carried by said guide operable axially thereof for clamping the said guide in its various positions of adjustment and a tool spindle rotatably movable in said guide.

4. An apparatus of the class described comprising in combination, a support, a head member adjustably movable in said support having a curved guide seat and an opening for receiving a spindle guide, a hollow guide member having a portion for bearing on said seat and a shank extending therefrom which extends through said opening, means carried by and movable axially of said shank and adapted to bear against said head for clamping said guide to said head in various positions of adjustment and a tool spindle movable in said hollow guide.

5. An apparatus of the class described comprising in combination, a support, a head member adjustable in said support having a curved socket and an opening extending therethrough, a guide member having a curved portion for bearing in said socket and a hollow shank extending through said opening, means axially exerted relatively to said shank for securing said guide to the head in various positions of adjustment and a tool spindle movable axially in said shank.

6. An apparatus of the class described comprising in combination, a support having formed at one end outer and inner curved surfaces disposed in concentric relation and a radial opening extending therethrough, a hollow guide having a curved surface for bearing on the inner surface of said head and a shank extending through said opening, a clamping device engaging said shank having a surface formed for bearing on the outer surface of said head whereby the guide may be clamped to said head in various positions of adjustment and a tool spindle movable in said guide.

7. An apparatus of the class described comprising in combination, a support, a head member having a curved socket on its inner side and a curved bearing surface on its outer side arranged in concentric relation and provided with a radial opening between said inner and outer sides, a guide having a complemental surface for bearing on the surface of said socket and a shank extending through said opening, a clamping collar having a surface formed to engage the outer side of said head and means associated with the said shank for bearing on said collar whereby the guide may be clamped to said head in various positions of adjustment the said guide having an opening therethrough for guiding a tool spindle.

8. An apparatus of the class described comprising in combination, a support, a head member having a semi-spherical socket in a side thereof and a semi-spherical surface on the opposite side thereof in concentric relation with respect thereto and provided with a radial opening extending therethrough, a guide provided with a portion for bearing in said socket and a shank extending through said opening, a clamping member having a surface complemental to the surface of the head, a clamping nut threaded on said shank for forcing said clamping nut against said head, whereby the guide is secured in said socket in various positions of adjustment, the said guide having an opening therethrough for receiving a tool spindle.

9. An apparatus of the class described comprising in combination, a support provided with a cylindrical opening in one end thereof, a head having a portion pivoted in said opening of said support and means for securing the same in various positions of adjustment, an articulated tool spindle guide movable with respect to said head into various positions of adjustment, means operable axially thereof for securing the same in various positions of adjustment in said guide.

10. An apparatus of the class described comprising in combination, a support, a guide provided with a spindle receiving bore arranged for a swinging movement in said support on a certain axis, means for clamping said guide to said support adapted to operate axially thereof in a direction corresponding to the axis of said opening in said guide, and a tool spindle in the bore of said guide.

11. An apparatus of the class described comprising in combination, a support, a guide provided with a spindle receiving bore arranged for a swinging movement in said support on a certain axis, means for clamping said guide to said support and adapted to operate axially in a direction corresponding to the axis of said opening in said guide, and yieldable means for holding said guide in said support during a relative swinging action thereof and a tool-carrying spindle movable in said bore.

12. In an apparatus of the class described in combination, a support, a hollow tool spindle guide movable therein for swinging movements in all directions relative thereto, clamping means independently movable relatively to said support and carried by said guide for securing said guide in any position within its range of movement, and a tool carrying spindle in said guide.

13. An apparatus of the class described comprising in combination, a support and a head adjustably pivoted therein which is provided with a socket, a guide provided with a spindle receiving bore oscillatable in the socket of said head for movements in all directions relative thereto, and clamping means associated with said guide and head for clamping them together which is operable in a direction corresponding to the axis of said bore whereby the said guide is centralized with respect to the socket as it is clamped thereto.

14. An apparatus of the class described comprising in combination a support having an end thereof adapted to engage a head member, a head member pivotally and adjustably connected to the support, a spindle guide adjustably oscillatable in said head, yielding means for holding the guide in the head, and means for clamping the guide and the head together, said clamping means operating in a direction parallel to the axis of the spindle guide so that the clamping operation will not disturb the axial alignment of the spindle guide and the head.

15. An apparatus of the class described comprising a head member, a spindle guide adjustably oscillatable in said head, yielding means for holding the guide in the head, and means for clamping the guide and the head together, said clamping means operating in a direction parallel to the axis of the spindle guide so that the clamping operation will not disturb the axial alignment of the spindle guide and the head.

16. An apparatus of the class described comprising a head member, a spindle guide adjustably oscillatable in said head, and yielding means operating in a direction parallel to the axis of the spindle guide for holding the guide in the head and preventing lateral motion thereof.

17. An apparatus of the class described comprising a support adapted to be secured to a cylinder block, a head carried by the support and provided with a spherical seat, a hollow spindle guide having a spherical portion fitting in the spherical seat of the head and a projection passing freely through a radial aperture in the head, and a spring strained between the guide and the head to keep the spherical portion of the guide firmly in the spherical seat of the head.

In testimony whereof I have affixed my signature.

JAMES Y. SCOTT.